United States Patent
Gaal et al.

(10) Patent No.: US 11,375,362 B2
(45) Date of Patent: Jun. 28, 2022

(54) INDICATING USER EQUIPMENT CAPABILITY FOR A COMMUNICATION FEATURE WITH BOTH FREQUENCY RANGE AND DUPLEX MODE DIFFERENTIATION

(71) Applicant: QUALCOMM Incorporated, San Diego, CA (US)

(72) Inventors: Peter Gaal, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/072,704

(22) Filed: Oct. 16, 2020

(65) Prior Publication Data

US 2021/0120401 A1 Apr. 22, 2021

Related U.S. Application Data

(60) Provisional application No. 62/916,778, filed on Oct. 17, 2019.

(51) Int. Cl.
*H04W 8/24* (2009.01)
*H04L 5/14* (2006.01)

(52) U.S. Cl.
CPC ............. *H04W 8/24* (2013.01); *H04L 5/1469* (2013.01)

(58) Field of Classification Search
CPC ...... H04W 8/24; H04W 88/06; H04L 5/1469; H04L 5/0048; H04L 5/0053
USPC .................................................. 370/328–329
See application file for complete search history.

(56) References Cited

U.S. PATENT DOCUMENTS

2014/0066057 A1* 3/2014 Kazmi ................ H04W 52/386
                                                                 455/433
2018/0131502 A1* 5/2018 Askar ...................... H04B 1/44

OTHER PUBLICATIONS

Huawei, et al., "Draft Reply LS on Ambiguity of UE L1 FDD&TDD FR1&FR2 Capabilities," 3GPP Draft; 3GPP TSG RAN WG1 Meeting #98bis, R1-1910400, 3rd Generation Partnership Project (3GPP), Mobile Competence Centre, 650, Route Des Lucioles, F-06921, Sophia-Antipolis Cedex, France, vol. RAN WG1. No. Chongqing. China, Oct. 14, 2019-Oct. 18, 2019, Oct. 5, 2019 (Oct. 5, 2019), XP051808556, 2 pages, Retrieved from the Internet: URL: https://ftp.3gpp.org/tsg_ran/WG1_RL1/TSGR1_98b/Docs/R1-1910400.zip R1-1910400.doc [retrieved on Oct. 5, 2019] p. 2.
International Search Report and Written Opinion—PCT/US2020/056292—ISA/EPO—dated Jan. 21, 2021.

* cited by examiner

*Primary Examiner* — Congvan Tran
(74) *Attorney, Agent, or Firm* — Qualcomm Incorporated

(57) ABSTRACT

In an aspect, a UE may determine a capability of the UE to support two or more frequency range and duplex mode combinations associated with a communication feature, wherein the communication feature is associated with a plurality of frequency ranges and is further associated with a plurality of duplex modes on at least one of the plurality of frequency ranges. The UE may transmit, to a core network component, a UE capability indication that indicates the determined capability. The core network component may receive the UE capability indication. The core network component may perform at least one action in response to the UE capability indication.

40 Claims, 12 Drawing Sheets

| B | C | D | E | F | G | H | I | J | K |
|---|---|---|---|---|---|---|---|---|---|
| FDD-TDD Diff | FR1-FR2 Diff | Capability per UE | Capability setting in FDD | Capability setting in TDD | Capability setting in FR1 | Capability setting in FR2 | Implied capability in FR1-FDD | Implied capability in FR1-TDD | Implied capability in FR2 |
| N | N | N | N/A | N/A | N/A | N/A | N | N | N |
| N | N | Y | N/A | N/A | N/A | N/A | Y | Y | Y |
| N | Y | N/A | N/A | N/A | N | N | N | N | N |
| N | Y | N/A | N/A | N/A | N | Y | N | N | Y |
| N | Y | N/A | N/A | N/A | Y | N | Y | Y | N |
| N | Y | N/A | N/A | N/A | Y | Y | Y | Y | Y |
| Y | N | N/A | N | N | N/A | N/A | N | N | N |
| Y | N | N/A | N | Y | N/A | N/A | N | Y | N/A |
| Y | N | N/A | Y | N | N/A | N/A | Y | N | N/A |
| Y | N | N/A | Y | Y | N/A | N/A | Y | Y | N/A |
| Y | Y | N/A | N | N | N | N | N | N | N |
| Y | Y | N/A | N | N | N | Y | N | N | Y |
| Y | Y | N/A | N | Y | N | N | N | Y | N |
| Y | Y | N/A | N | Y | N | Y | N | Y | Y |
| Y | Y | N/A | Y | N | Y | N | Y | N | N |
| Y | Y | N/A | Y | N | Y | Y | Y | N | Y |
| Y | Y | N/A | Y | Y | Y | N | Y | Y | N |
| Y | Y | N/A | Y | Y | Y | Y | Y | Y | Y |

| B | C | D | E | F | G | H | I | J | K |
|---|---|---|---|---|---|---|---|---|---|
| FDD-TDD Diff | FR1-FR2 Diff | Capability per UE | Capability setting in FDD | Capability setting in TDD | Capability setting in FR1 | Capability setting in FR2 | Implied capability in FR1-FDD | Implied capability in FR1-TDD | Implied capability in FR2 |
| N | N | N | N/A | N/A | N/A | N/A | N | N | N |
| N | N | Y | N/A | N/A | N/A | N/A | Y | Y | Y |
| N | Y | N/A | N/A | N/A | N | N | N | N | N |
| N | Y | N/A | N/A | N/A | N | Y | N | N | Y |
| N | Y | N/A | N/A | N/A | Y | N | Y | Y | N |
| N | Y | N/A | N/A | N/A | Y | Y | Y | Y | Y |
| Y | N | N/A | N | N | N/A | N/A | N | N | N |
| Y | N | N/A | N | Y | N/A | N/A | N | Y | Y |
| Y | N | N/A | Y | N | N/A | N/A | Y | N | N |
| Y | N | N/A | Y | Y | N/A | N/A | Y | Y | Y |
| Y | Y | N/A | N | N | N | N | N | N | N |
| Y | Y | N/A | N | N | N | Y | N | N | Y |
| Y | Y | N/A | N | N | Y | N | N | Y | N |
| Y | Y | N/A | N | N | Y | Y | N | Y | Y |
| Y | Y | N/A | N | Y | N | N | N | N | N |
| Y | Y | N/A | N | Y | N | Y | N | N | Y |
| Y | Y | N/A | Y | N | Y | N | Y | N | N |
| Y | Y | N/A | Y | N | Y | Y | Y | N | Y |
| Y | Y | N/A | Y | Y | Y | N | Y | Y | N |
| Y | Y | N/A | Y | Y | Y | Y | Y | Y | Y |

= I    = J    Don't care    = K

FIG. 7

INDICATING USER EQUIPMENT CAPABILITY FOR A COMMUNICATION FEATURE WITH BOTH FREQUENCY RANGE AND DUPLEX MODE DIFFERENTIATION

CROSS-REFERENCE TO RELATED APPLICATION

The present application for patent claims the benefit of U.S. Provisional Application No. 62/916,778, entitled "INDICATING UE CAPABILITY FOR A COMMUNICATION FEATURE WITH BOTH FREQUENCY RANGE AND DUPLEX MODE DIFFERENTIATION", filed Oct. 17, 2019, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses for indicating user equipment (UE) capability for a communication feature with both frequency range and duplex mode differentiation.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In 5G NR systems, various communication features may be associated with one or more frequency ranges (e.g., FR1, FR2, etc.) and one or more duplex modes, such as frequency division duplex (FDD) and time divisional duplex (TDD). If a particular communication feature is associated with multiple frequency ranges, that communication feature may be characterized as 'differentiated' with respect to frequency range, which may be denoted as FRX. If a particular communication feature is associated with multiple duplex modes on at least one frequency range, that communication feature may be characterized as 'differentiated' with respect to duplex mode, which may be denoted as XDD.

Even if a communication feature is differentiated with respect to frequency range and/or duplex mode, some UEs may not support all associated frequency ranges and/or duplex modes for that communication feature. For example, relative to 'normal' UEs, NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. In some implementations, NR-Light UEs may not be able to support all of the frequency ranges and/or duplex modes for a particular communication feature.

In conventional 5G NR systems, when a communication feature is differentiated with respect to FDD and TDD, UEs associated with that communication feature are required to separately indicate their support for FDD and TDD. Likewise, in conventional 5G NR systems, when a communication feature is differentiated with respect to frequency range (e.g., FR1 and FR2), UEs associated with that communication feature are required to separately indicate their support for FR1 and FR2.

The above-noted UE capability reporting works well in scenarios where, with respect to a particular communication feature, (i) there is neither FRX nor XDD, (ii) there is FRX but no XDD, and (iii) there is XDD but no FRX. However, ambiguity results with respect to scenarios where both FRX and XDD are associated with a particular communication feature. One or more embodiments of the disclosure are thereby directed to resolving ambiguity in scenarios where both FRX and XDD are associated with a particular communication feature.

In an aspect of the disclosure, a method, a computer-readable medium, and an apparatus are provided. The apparatus may be a UE. The UE may determine a capability of the UE to support two or more frequency range and duplex mode combinations associated with a communication feature, wherein the communication feature is associated with a plurality of frequency ranges and is further associated with a plurality of duplex modes on at least one of the plurality of frequency ranges. The UE may transmit, to a core network component, a UE capability indication that indicates the determined capability.

In an aspect of the disclosure, a method, a computer-readable medium, and an apparatus are provided. The apparatus may be a core network component. The core network component may receive, from a UE, a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges. The core network component may perform at least one action in response to the UE capability indication The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 6 illustrates an example implementation of the processes of FIGS. 4-5 in accordance with another embodiment of the disclosure.

FIG. 7 is a conceptual data flow diagram illustrating data flow between different means/components according to an aspect of the disclosure.

DETAILED DESCRIPTION

Figure 1:
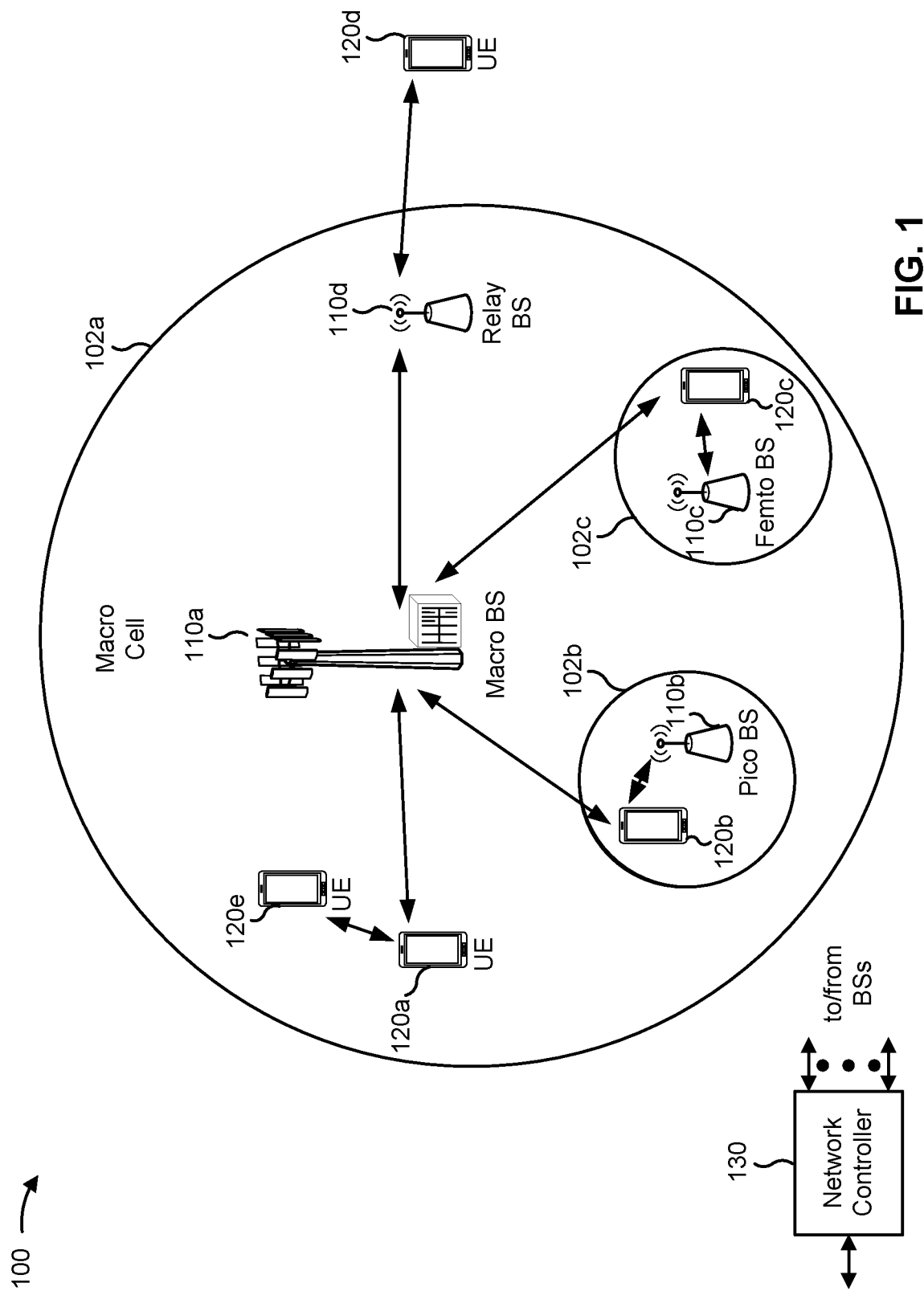
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs).

In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
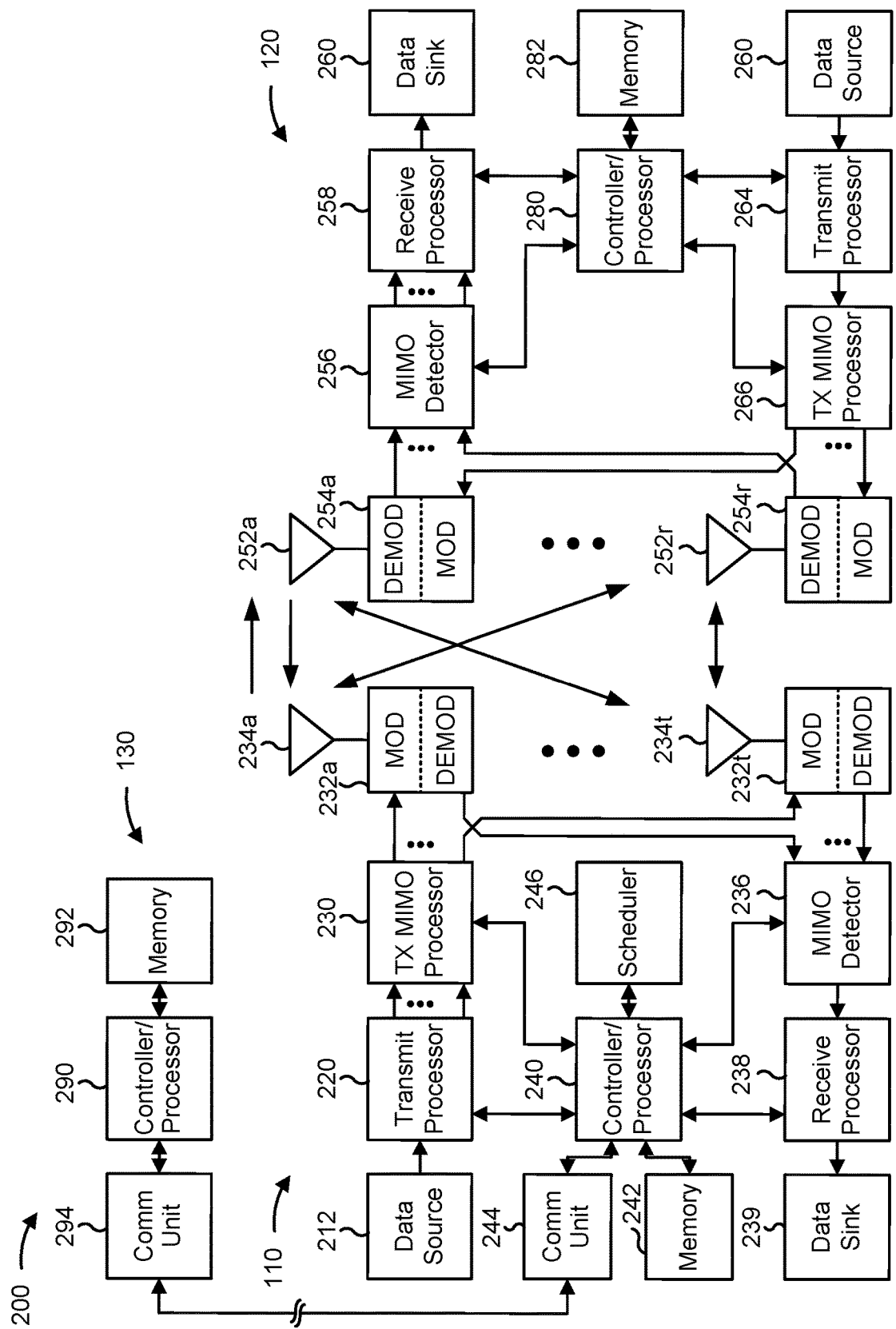
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 260 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3A:
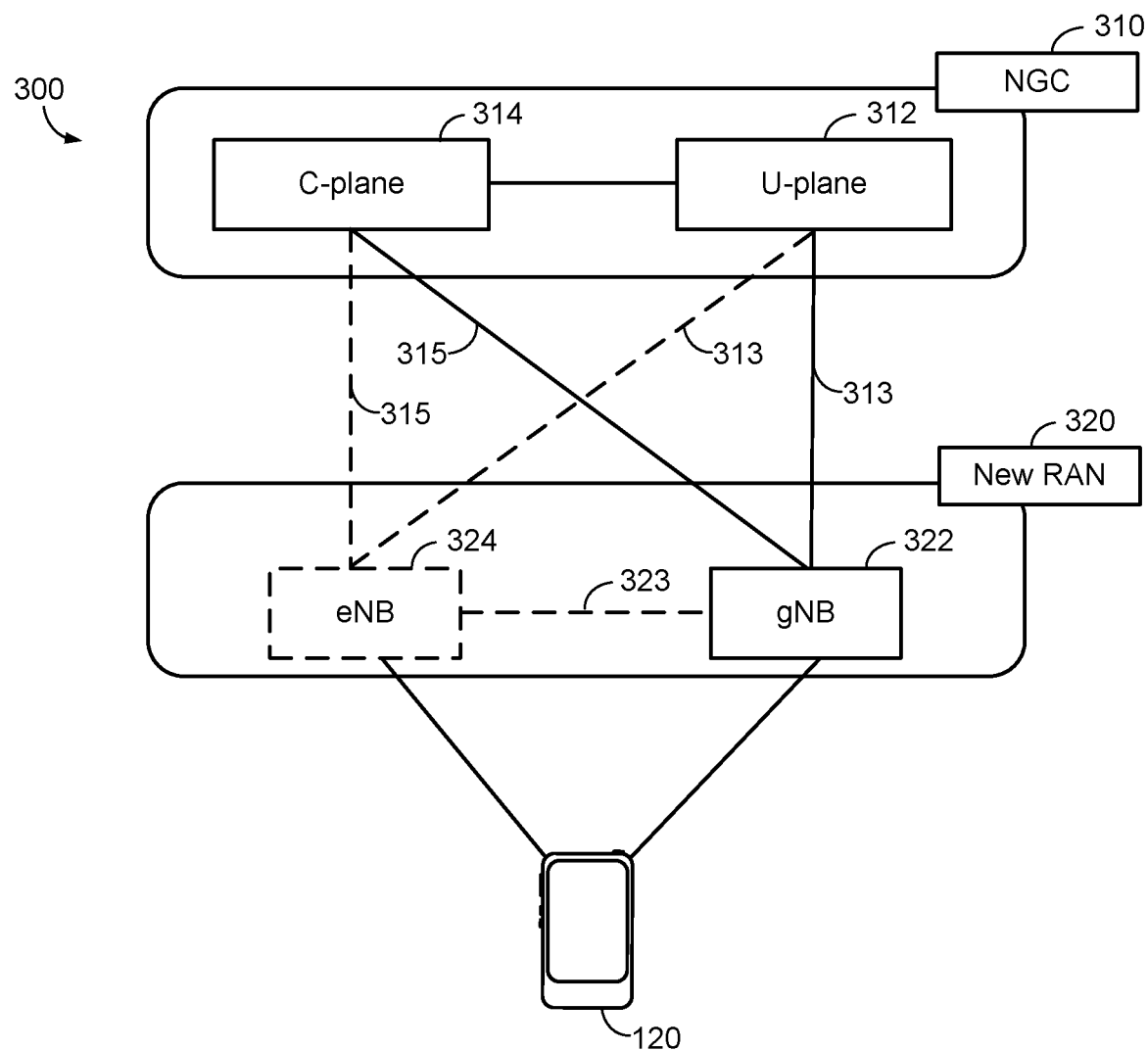
FIG. 3A illustrates an example wireless network structure.

According to various aspects, FIG. 3A illustrates an example wireless network structure 300. For example, a Next Generation Core (NGC) 310 can be viewed functionally as control plane functions 314 (e.g., UE registration, authentication, network access, gateway selection, etc.) and user plane functions 312, (e.g., UE gateway function, access to data networks, IP routing, etc.) which operate cooperatively to form the core network. User plane interface (NG-U) 313 and control plane interface (NG-C) 315 connect the gNB 322 to the NGC 310 and specifically to the control plane functions 314 and user plane functions 312. In an additional configuration, an eNB 324 may also be connected to the NGC 310 via NG-C 315 to the control plane functions 314 and NG-U 313 to user plane functions 312. Further, eNB 324 may directly communicate with gNB 322 via a backhaul connection 323. Accordingly, in some configurations, the New RAN 320 may only have one or more gNBs 322, while other configurations include one or more of both eNBs 324 and gNBs 322. Either gNB 322 or eNB 324 may communicate with UE 120 (e.g., as described above with respect to FIGS. 1-2).

Figure 3B:
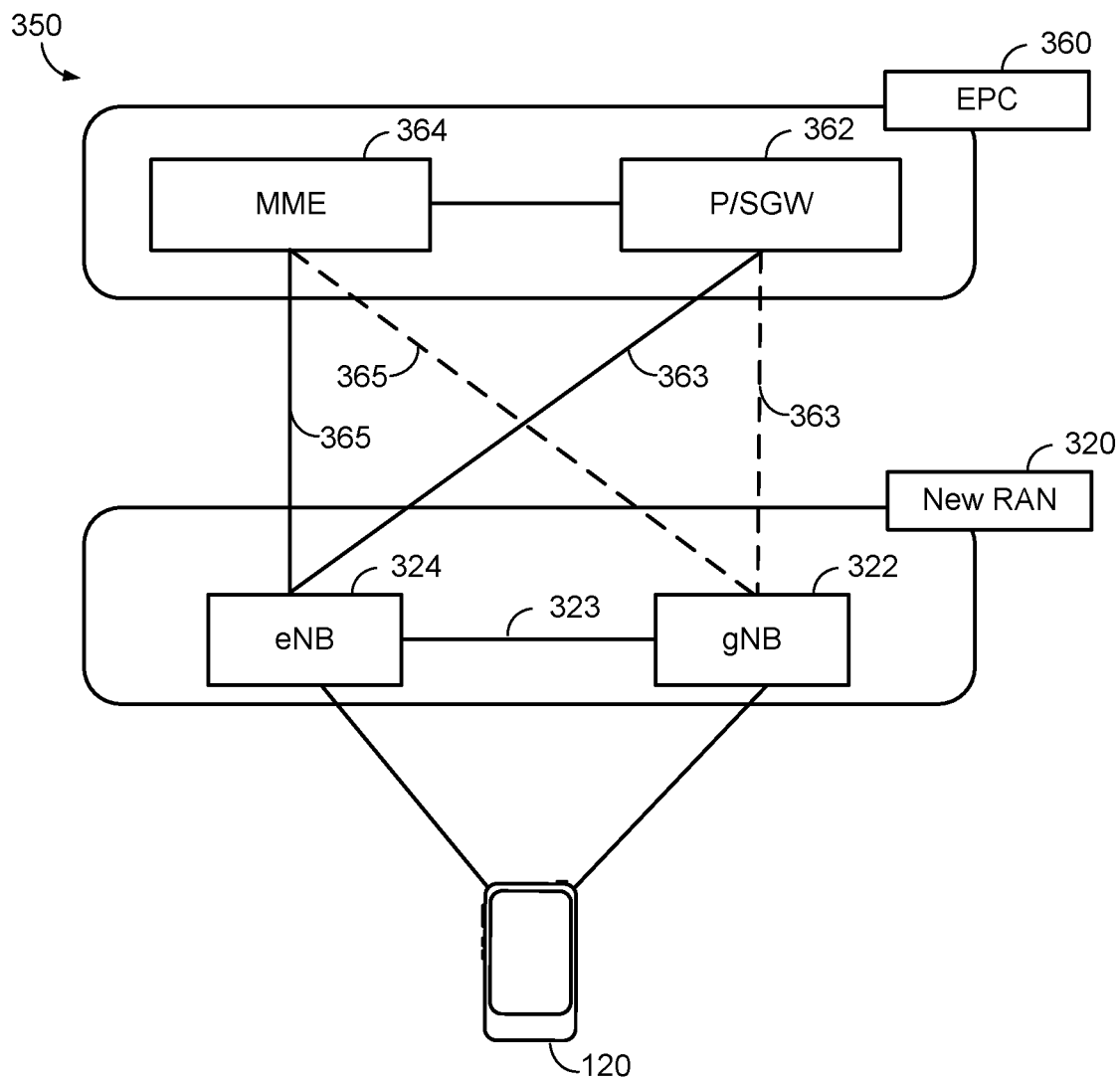
FIG. 3B illustrates another example wireless network structure.

According to various aspects, FIG. 3B illustrates another example wireless network structure 350. For example, Evolved Packet Core (EPC) 360 can be viewed functionally as control plane functions, Mobility Management Entity (MME) 364 and user plane functions, Packet Data Network Gateway/Serving Gateway (P/SGW) 362, which operate cooperatively to form the core network. S1 user plane interface (S1-U) 363 and S control plane interface (S1-MME) 365 connect the eNB 324 to the EPC 360 and specifically to MME 364 and P/SGW 362. In an additional configuration, a gNB 322 may also be connected to the EPC 360 via S-MME 365 to MME 364 and S1-U 363 to P/SGW 362. Further, eNB 324 may directly communicate to gNB 322 via the backhaul connection 323, with or without gNB direct connectivity to the EPC 360. Accordingly, in some configurations, the New RAN 320 may only have one or more gNBs 322, while other configurations include one or more of both eNBs 324 and gNBs 322. Either gNB 322 or eNB 324 may communicate with UE 120 (e.g., as described above with respect to FIGS. 1-2).

In 5G NR systems, various communication features may be associated with one or more frequency ranges (e.g., FR1, FR2, etc.) and one or more duplex modes, such as frequency division duplex (FDD) and time divisional duplex (TDD). If a particular communication feature is associated with multiple frequency ranges, that communication feature may be characterized as 'differentiated' with respect to frequency range, which may be denoted as FRX. If a particular communication feature is associated with multiple duplex modes on at least one frequency range, that communication feature may be characterized as 'differentiated' with respect to duplex mode, which may be denoted as XDD.

Even if a communication feature is differentiated with respect to frequency range and/or duplex mode, some UEs may not support all associated frequency ranges and/or duplex modes for that communication feature. For example, relative to 'normal' UEs, NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. In some implementations, NR-Light UEs may not be able to support all of the frequency ranges and/or duplex modes for a particular communication feature.

In conventional 5G NR systems, when a communication feature is differentiated with respect to FDD and TDD, UEs associated with that communication feature are required to separately indicate their support for FDD and TDD. Likewise, in conventional 5G NR systems, when a communication feature is differentiated with respect to frequency range (e.g., FR1 and FR2), UEs associated with that communication feature are required to separately indicate their support for FR1 and FR2.

The above-noted UE capability reporting works well in scenarios where, with respect to a particular communication feature, (i) there is neither FRX nor XDD, (ii) there is FRX but no XDD, and (iii) there is XDD but no FRX. However, ambiguity results with respect to scenarios where both FRX and XDD are associated with a particular communication feature. One or more embodiments of the disclosure are thereby directed to resolving ambiguity in scenarios where both FRX and XDD are associated with a particular communication feature.

A few non-limiting examples of communication features in 5G NR that are associated with both FRX and XDD are provided in Table 1, as follows:

TABLE 1

Examples of Communication Features Associated with Both XDD and FRX

| Feature Index | Feature group | Components |
|---|---|---|
| 3-6 | Dynamic SFI monitoring | Adjust periodic and semi-persistent signal reception and transmission in response to detected dynamic UL/DL configuration |
| 4-2 | 2 PUCCH of format 0 or 2 in consecutive symbols | 1) 2 PUCCH format 0/2 in different symbols and once per slot for HARQ-ACK, 2) 2 PUCCH format 0 in different symbols and once per slot for SR 3) 2 PUCCH format 2 in different symbols and once per slot for CSI over two consecutive OFDM symbols |
| 5-30 | DL scheduling slot offset greater than zero for PDSCH mapping type A | Support of DL scheduling slot offset (K0) greater than zero for PDSCH mapping type A |
| 5-30a | DL scheduling slot offset greater than zero for PDSCH mapping type B | Support of DL scheduling slot offset (K0) greater than zero for PDSCH mapping type B |
| 5-31 | UL scheduling slot offset greater than 12 | Support of UL scheduling slot offset (K2) greater than 12 |
| 8-8 | UL power control with 2 PUSCH closed loops | Two different TPC loops |
| 8-9 | UL power control with 2 PUCCH closed loops | Two different TPC loops |

Figure 4:
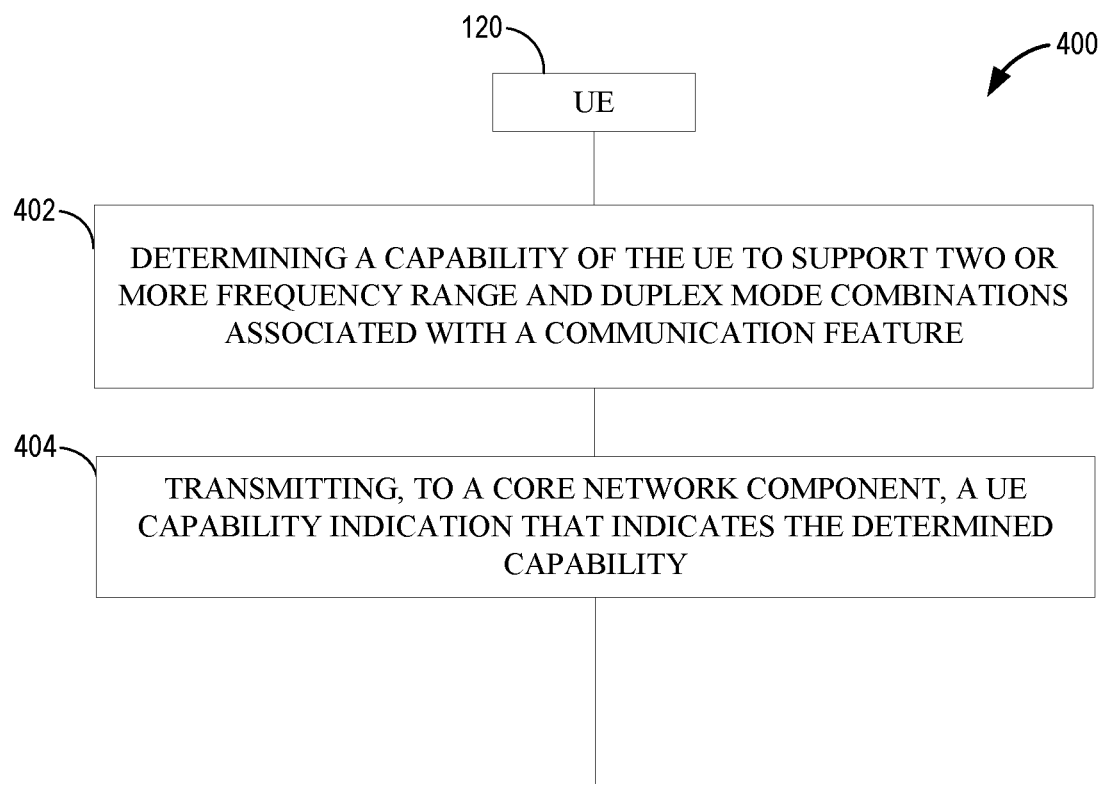
FIG. 4 illustrates an exemplary process of wireless communications according to an aspect of the disclosure.

FIG. 4 illustrates an exemplary process 400 of wireless communications according to an aspect of the disclosure. The process 400 of FIG. 4 is performed by UE 120.

At 402, the UE 120 (e.g., controller/processor 280) determines a capability of the UE to support two or more frequency range and duplex mode combinations associated with a communication feature, wherein the communication feature is associated with a plurality of frequency ranges and is further associated with a plurality of duplex modes on at least one of the plurality of frequency ranges. In some designs, in a first frequency range (e.g., FR1) among the plurality of frequency ranges, the communication feature is associated with each of the plurality of duplex modes (e.g., FDD and TDD), and in a second frequency range (e.g., FR2) among the plurality of frequency ranges, the communication feature is associated with a single one of the plurality of duplex modes (e.g., TDD).

At 404, the UE 120 (antenna(s) 252a ... 252r, TX MIMO processor 266, modulators(s) 254a ... 254r, TX processor 264) transmits, to a core network component, a UE capability indication that indicates the determined capability. In some designs, the core network component to which the UE capability indication is transmitted may be part of the NGC 310 of FIG. 3A or the EPC 360 of FIG. 3B. In an example, the UE capability indication may comprise a set of bits, whereby a number of bits included in the set of bits may be equal to a number of duplex mode and frequency range combinations that are associated with (or available for) the communication feature (e.g., 1:1 mapping of bits per duplex mode and frequency range combination permitted for that communication feature) or alternatively may be equal to a total number of duplex mode and frequency range combinations irrespective of whether the respective duplex mode and frequency range combinations (or pairings) are associated with (or available for) the communication feature (e.g., N:1 mapping of bits per duplex mode and frequency range combination permitted/available for that communication feature).

Figure 5:
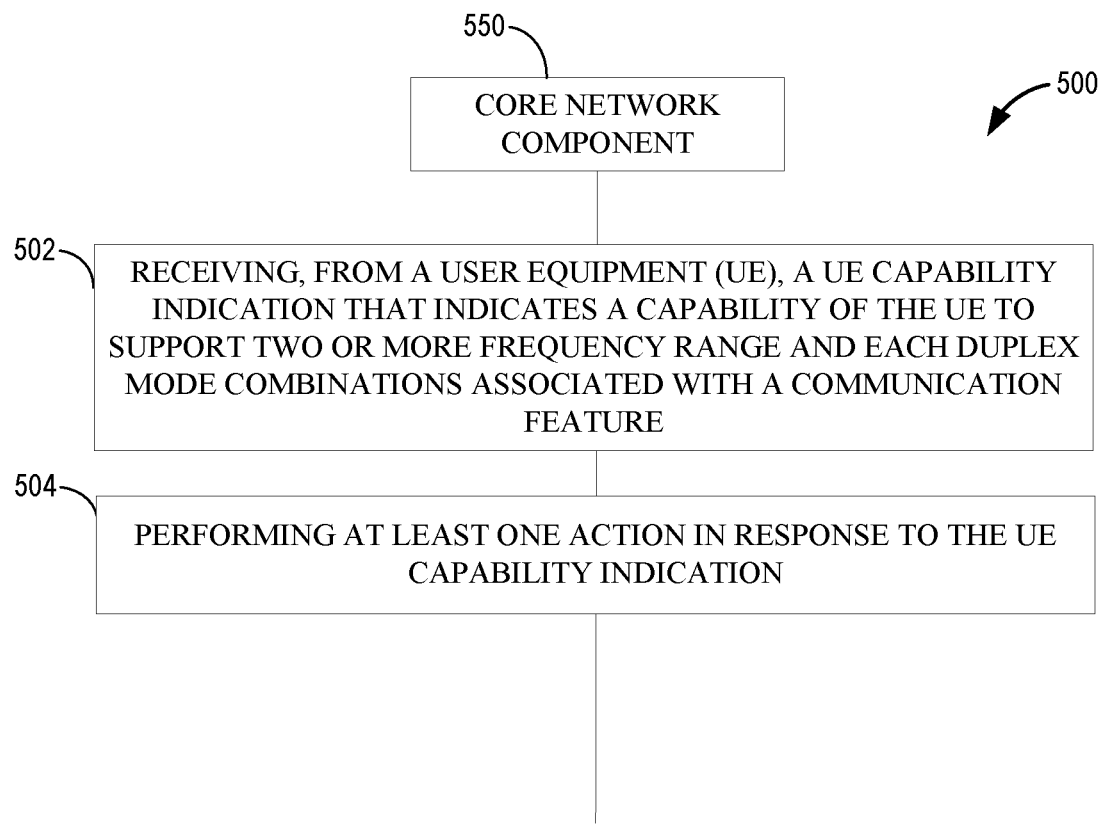
FIG. 5 illustrates an exemplary process of wireless communications according to another aspect of the disclosure.

FIG. 5 illustrates an exemplary process 500 of wireless communications according to an aspect of the disclosure. The process 500 of FIG. 5 is performed by a core network component 505 (e.g., a component of NGC 310, EPC 360, network controller 130 of FIG. 2, etc.).

At 502, the core network component 550 receives, from a UE (e.g., via backhaul interface forwarding from the BS 110), a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges. In some designs, in a first frequency range (e.g., FR1) among the plurality of frequency ranges, the communication feature is associated with each of the plurality of duplex modes (e.g., FDD and TDD), and in a second frequency range (e.g., FR2) among the plurality of frequency ranges, the communication feature is associated with a single one of the plurality of duplex modes (e.g., TDD). In an example, the UE capability indication may comprise a set of bits, whereby a number of bits included in the set of bits may be equal to a number of duplex mode and frequency range combinations that are associated with the communication feature (e.g., 1:1 mapping of bits per duplex mode and frequency range combination permitted/available for that communication feature) or alternatively may be equal to a total possible number of duplex mode and frequency range combinations (e.g., irrespective of whether the respective duplex mode and frequency range combinations are associated with the communication feature). In some designs, the total "possible" number of duplex mode and frequency range combinations includes each duplex mode and frequency range combination permitted/available for that communication feature (e.g., as pre-defined in the relevant standard, etc.). In the case where the total possible number of duplex mode and frequency range combinations are indicated, the set of bits is configured with an N:1 mapping of bits per duplex mode and frequency range combination permitted/available for that communication feature.

At 504, the core network component 505 performs at least one action in response to the UE capability indication. In some designs, the at least one action may comprise updating a status of the UE to reflect its level of support for the communication feature. In other designs, the at least one action may comprise instructing the BS 110 to modify a manner in which the BS 110 is performing the communication feature with respect to the UE (e.g., to regulate the resources allocated to the UE so as to conform with the UE's reported capability for that communication feature).

Referring to FIGS. 4-5, in some designs, the indication may be provided via a set of bits. In an example where there are two frequency ranges (FR1 and FR2) and two duplex modes (FDD and TDD), assume the communication feature is associated with FDD and TDD in FR1 (e.g., the communication feature may use one or both duplex modes thereon) and that the communication feature is associated with TDD (e.g., only TDD) in FR2. In this case, since FR2-FDD is not supported, there are three Boolean variables; namely, FR1-FDD status (YES/NO), FR1-TDD status (YES/NO) and FR2 status (YES/NO). As is known in the art, three Boolean variables map to 2$^3$ (i.e., 8) possible pairings or combinations, each of which can be mapped to a unique bit configuration (or codepoint) of a set of 3 bits (e.g., 000, 001, 010, etc.). In some designs, 4 bits may be available to convey the UE capability information, such that a total of 16 codepoints may be indicated. As described below, in some designs, only the necessary codepoints (e.g., 8 codepoints that each correspond to a different one of the available 8 TDD/FDD/FR1/FR2 combinations for the communication feature) may be used to provide the UE capability indication, while in other designs, more codepoints may be used to provide the UE capability indication.

FIG. 6 illustrates UE capability indication configuration options for a particular communication feature in accordance with an embodiment of the disclosure. In FIG. 6, in a scenario where there is both XDD (Column B, or FDD-TDD Diff) and FRX (Column C, or FR1-FR1 Diff), Columns E, F, G and H depict the 16 total TDD/FDD/FR1/FR2 combinations, of which 8 are actually useable (e.g., available or permitted) under the above-noted assumptions for the communication feature where FR2-FDD is known to not be available. Hence, codepoints corresponding to unavailable TDD/FDD/FR1/FR2 combinations are denoted in Columns I, J and K as "N/A". In some designs, the unused codepoints can optionally be used for other function(s) in some designs. To put another way, there is a 1:1 mapping between used codepoints and available TDD/FDD/FR1/FR2 combinations under the assumptions noted above.

Referring to FIG. 6, there are various ways in which the used codepoints can be mapped to the available (or permitted) TDD/FDD/FR1/FR2 combinations for the communication feature. In the example depicted in FIG. 6, Column E is mapped to Column I, Column F. is mapped to Column J, and Column H is mapped to Column K. In the Example depicted in FIG. 6, Column G is a 'don't care' or unused state Column which is used to create the 8 element valid codepoint subset (e.g., Column G=(I or J)).

FIG. 7 illustrates UE capability indication configuration options in accordance with an alternative embodiment of the disclosure. In FIG. 7, all 16 codepoints are used, irrespective of whether a respective codepoint is mapped to an unavailable TDD/FDD/FR1/FR2 combination for the communication feature. In FIG. 7, Column G has no impact on Columns I, J or K.

Referring to FIGS. 6-7, rules by which FR1-FDD status (Column I), FR1-TDD status (Column J) and FR2 status (Column K) can be indicated may include any of the following:
  The UE supports FDD on the first frequency range if the UE capability indication indicates that the UE supports FDD. For example, the UE capability indication expressly indicates that the UE supports FDD (Column E) so as to implicitly indicate that the UE supports FDD on the first frequency range (Column I),
  The UE supports TDD on the first frequency range if the UE capability indication indicates that the UE supports TDD. For example, the UE capability indication expressly indicates that the UE supports TDD (Column F) so as to implicitly indicate that the UE supports TDD on the first frequency range (Column F) irrespective of whether TDD is supported on the second frequency range,
  The UE supports FDD, TDD or both FDD and TDD, on the first frequency range if the UE capability indication indicates that the UE supports the first frequency range and support TDD. For example, the UE capability indication expressly indicates that the UE supports the first frequency range (Column G) so as to implicitly indicate that the UE supports FDD, TDD or both FDD and TDD, on the first frequency range (Column I and/or Column J), and further expressly indicates that the UE supports TDD (Column F) so as to implicitly indicate that the UE supports TDD on the first frequency range (Column J), The UE supports FDD, TDD or both FDD and TDD on the first frequency range if the UE capability indication indicates that the UE supports the first frequency range. For example, the UE capability indication expressly indicates that the UE supports the first frequency range (Column G) so as to implicitly indicate that the UE supports FDD, TDD or both FDD and TDD, on the first frequency range (Column I and/or Column J), and otherwise set to non-supported, The UE supports TDD on the second frequency range if the UE capability indication indicates that the UE supports the second frequency range. For example, the UE capability indication expressly indicates that the UE supports the second frequency range (Column H) so as to implicitly indicate that the UE supports TDD on the second frequency range (Column K), or any combination thereof FIG. 8 illustrates an example implementation 800 of the processes 400-500 of FIGS. 4-5 in accordance with an embodiment of the disclosure.

Figure 8:
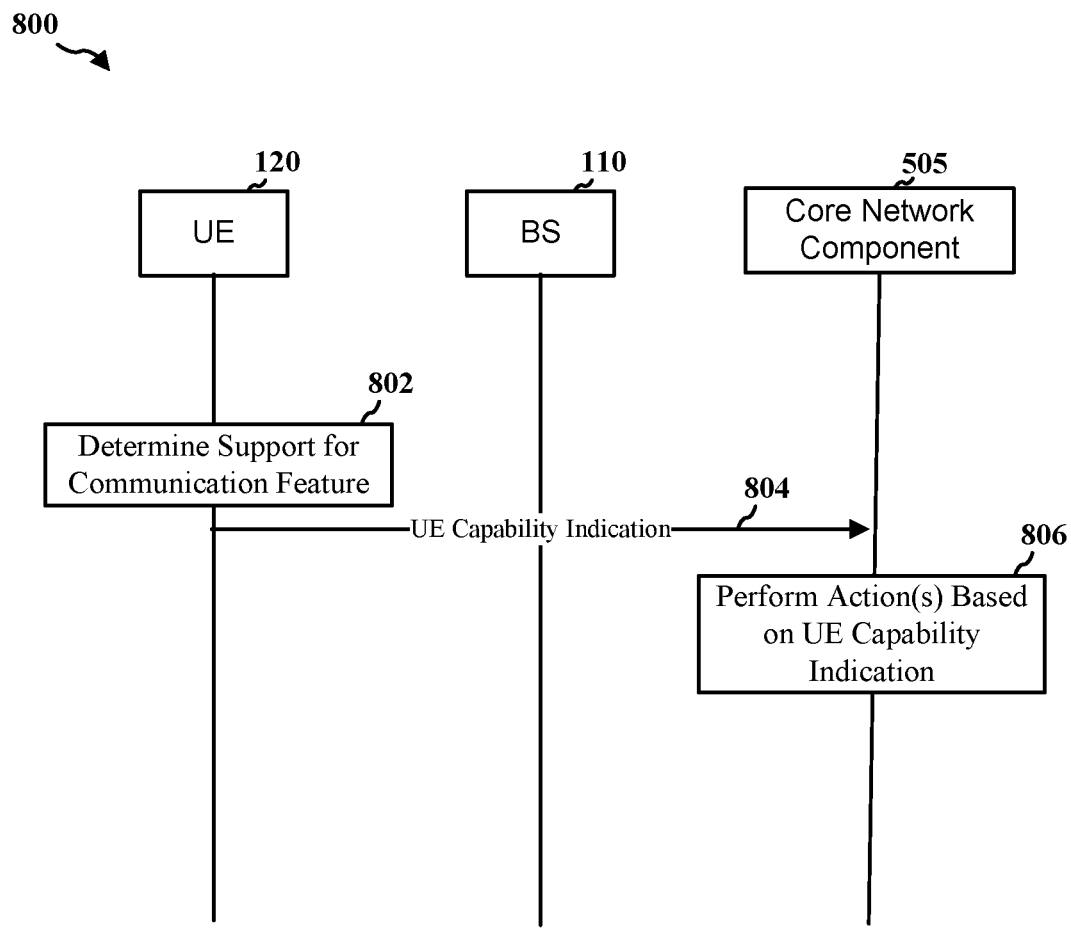
FIG. 8 is a diagram illustrating an example of a hardware implementation for an apparatus employing a processing system according to an aspect of the disclosure.

Referring to FIG. 8, at 802 (e.g., as in 402 of FIG. 5), UE 120 determines, with respect to a communication feature that is associated with a plurality of frequency ranges and is further associated with a plurality of duplex modes on at least one of the plurality of frequency ranges, a capability of the UE to support the communication feature with respect to each frequency range and each duplex mode combination that is associated with the communication feature. At 804 (e.g., as in 404 of FIG. 4 and 502 of FIG. 5), UE 120 transmits, to the core network component 505, UE capability indication that indicates the determined capability. At 806 (e.g., as in 504 of FIG. 5), the core network component 505 performs at least one action in response to the UE capability indication.

Figure 9:
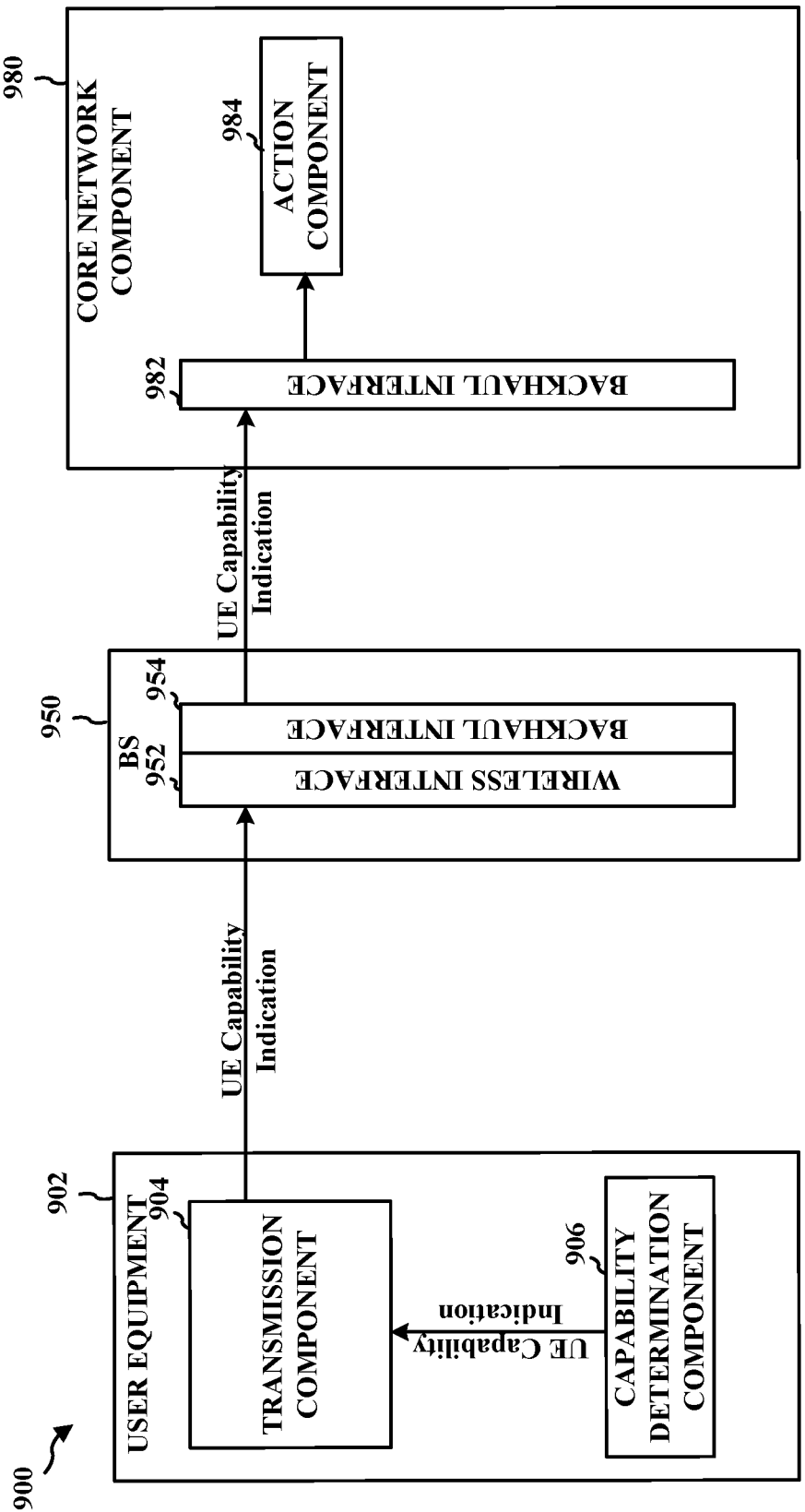
FIG. 9 is a diagram illustrating an example of a hardware implementation for an apparatus employing a processing system according to another aspect of the disclosure.

FIG. 9 is a conceptual data flow diagram 900 illustrating the data flow between different means/components in exemplary apparatuses 902, 950 and 980 in accordance with an embodiment of the disclosure. The apparatus 902 may be a UE (e.g., UE 120), the apparatus 950 may be a BS (e.g., BS 110) and the apparatus 980 may be a core network component (e.g., core network component 505).

The apparatus 902 includes a transmission component 904, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 902 further includes a capability determination component 906, which may correspond to processor circuitry in UE 120 as depicted in FIG. 2, including controller/processor 280, etc.

The apparatus 950 includes a wireless interface 952, which may correspond to transceiver circuitry in BS 110 as depicted in FIG. 2, including controller/processor 240, antenna(s) 234a . . . 234r, demodulators(s) 232a . . . 232r, MIMO detector 236, RX processor 238, communication unit 244, modulators(s) 232a . . . 232r, Tx MIMO processor 230, TX processor 220, etc. The apparatus 950 further includes a backhaul interface 954 (e.g., controller/processor 240, communication unit 244, etc.).

The apparatus 980 includes a backhaul interface 982 (e.g., communication unit 294, controller processor 290, etc.). The apparatus 980 further includes an action component 984 (e.g., communication unit 294, controller processor 290, etc.).

Referring to FIG. 9, the capability determination component 906 determines, with respect to a communication feature that is associated with a plurality of frequency ranges and is further associated with a plurality of duplex modes on at least one of the plurality of frequency ranges, a capability of the UE to support the communication feature with respect to each frequency range and each duplex mode combination that is associated with the communication feature. The transmission component 904 transmits UE capability indication that indicates the determined capability to the wireless interface 952 of the apparatus 950. The backhaul interface 954 transmits the UE capability indication to the backhaul interface of the apparatus 980, which in turn forwards the UE capability indication to the action component 984. The action component 984 then performs one or more actions based on the UE capability information.

One or more components of the apparatus 902 and apparatus 980 may perform each of the blocks of the algorithm in the aforementioned flowcharts of FIGS. 4-5 and 8. As such, each block in the aforementioned flowcharts of FIGS. 4-5 and 8 may be performed by a component and the apparatus 902 and apparatus 980 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
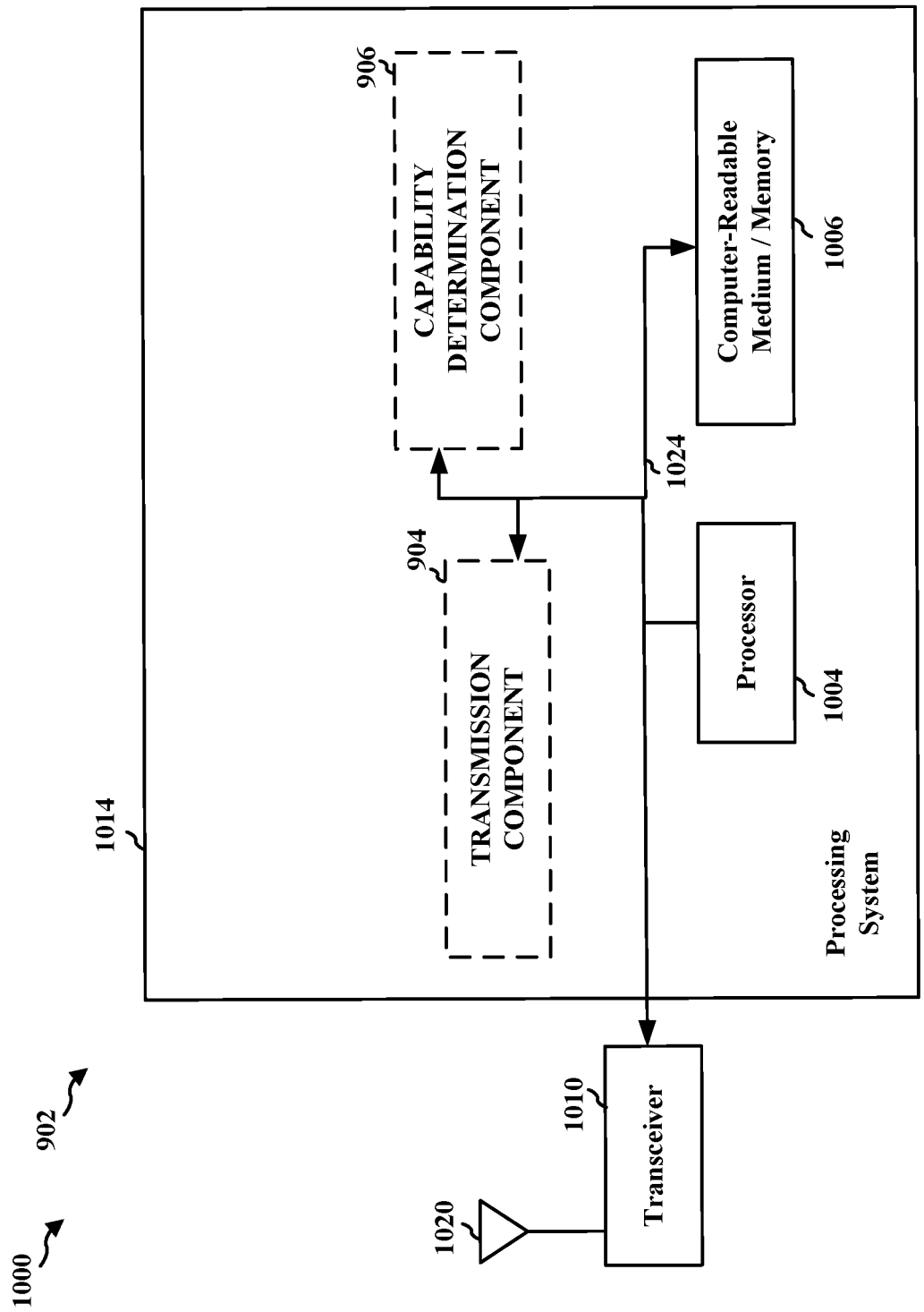
FIG. 10 is a diagram illustrating an example of a hardware implementation for an apparatus employing a processing system.

FIG. 10 is a diagram 1000 illustrating an example of a hardware implementation for an apparatus 902 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904 and 906, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, specifically the transmission component 904, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904 and 906. The components may be software components running in the processor 1004, resident/stored in the computer readable medium/memory 1006, one or more hardware components coupled to the processor 1004, or some combination thereof. The processing system 1014 may be a component of the UE 120 of FIG. 2 and may include the memory 282, and/or at least one of the TX processor 264, the RX processor 258, and the controller/processor 280.

In one configuration, the apparatus 902 (e.g., a UE) for wireless communication includes means for determining, with respect to a communication feature that is associated with a plurality of frequency ranges and is further associated with a plurality of duplex modes on at least one of the plurality of frequency ranges, a capability of the UE to support the communication feature with respect to each frequency range and each duplex mode combination that is associated with the communication feature, and means for transmitting, to a core network component, UE capability indication that indicates the determined capability. The aforementioned means may be one or more of the aforementioned components of the apparatus 902 and/or the processing system 1014 of the apparatus 902 configured to perform the functions recited by the aforementioned means. As described supra, the processing system 1014 may include the TX processor 264, the RX processor 258, and the controller/processor 280.

Figure 11:
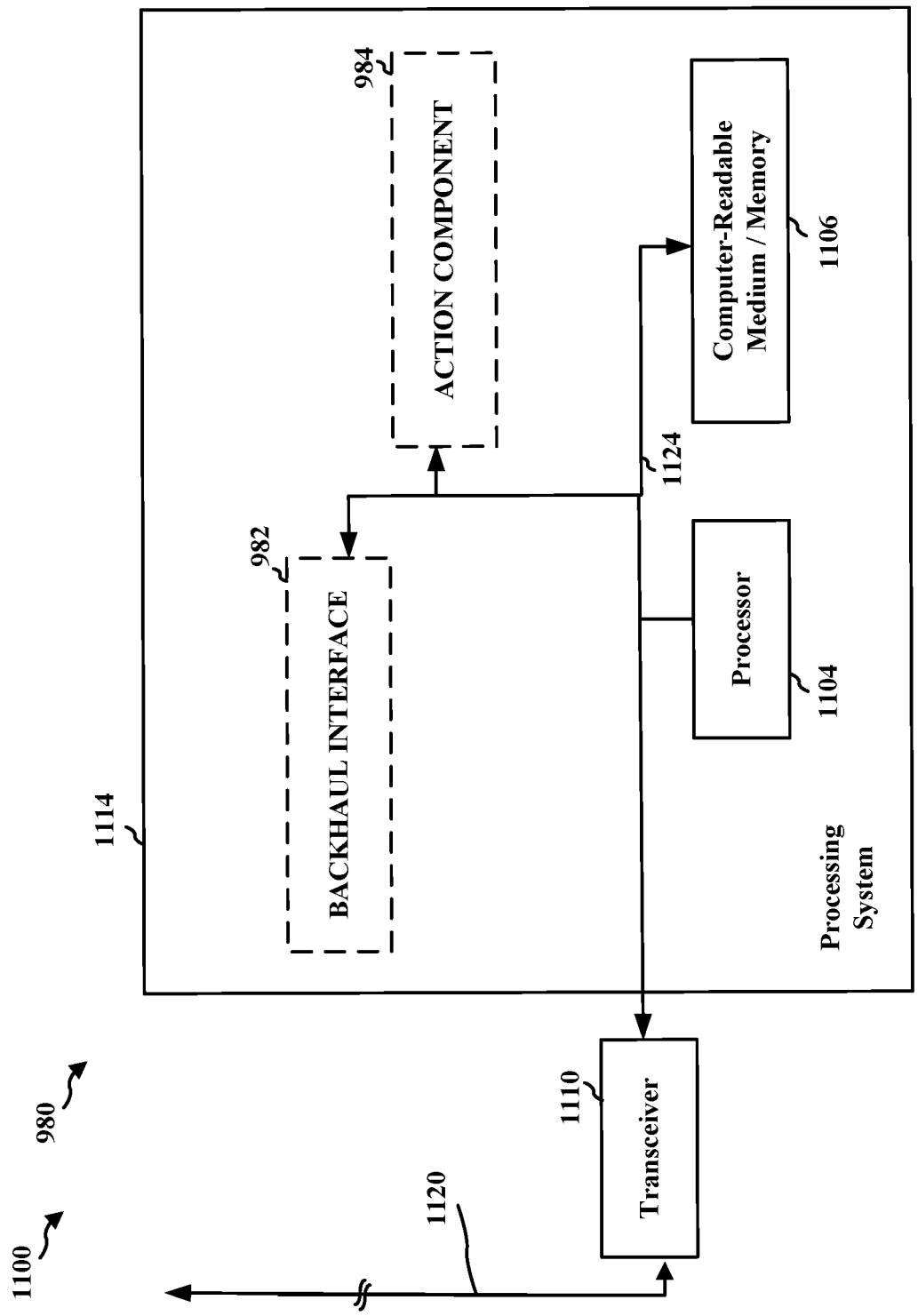
FIG. 11 is a diagram illustrating an example of a hardware implementation for an apparatus employing a processing system.

FIG. 11 is a diagram 1100 illustrating an example of a hardware implementation for an apparatus 980 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 982 and 984, and the computer-readable medium/ memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more wired communication lines 1120. The transceiver 1110 provides a means for communicating with various other apparatus over a transmission medium. The transceiver 1110 receives a signal from the one or more wired communication lines 1120, extracts information from the received signal, and provides the extracted information to the processing system 1114, specifically the backhaul interface 982. In addition, the transceiver 1110 receives information from the processing system 1114, specifically the backhaul interface 982, and based on the received information, generates a signal to be applied to one or more wired communication lines 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 982 and 986. The components may be software components running in the processor 1104, resident/stored in the computer readable medium/memory 1106, one or more hardware components coupled to the processor 1104, or some combination thereof. The processing system 1114 may be a component of the network controller 130 or the core network component 505 of FIG. 5, and may include the communication unit 294, the controller/processor 290 and/or the memory 292.

In one configuration, the apparatus 980 (e.g., a core network component) for wireless communication includes means for receiving, from a UE with respect to a communication feature that is associated with a plurality of frequency ranges and is further associated with a plurality of duplex modes on at least one of the plurality of frequency ranges, UE capability indication that indicates a capability of the UE to support the communication feature with respect to each frequency range and each duplex mode combination that is associated with the communication feature, and means for performing at least one action in response to the UE capability indication. The aforementioned means may be one or more of the aforementioned components of the apparatus 980 and/or the processing system 1114 of the apparatus 980 configured to perform the functions recited by the aforementioned means. As described supra, the processing system 1114 may include the communication unit 294, the controller/processor 290 and/or the memory 292.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a user equipment (UE), comprising:
   determining a capability of the UE to support two or more frequency range and duplex mode combinations associated with a communication feature, wherein the communication feature is associated with a plurality of frequency ranges and is further associated with a plurality of duplex modes on at least one of the plurality of frequency ranges; and transmitting, to a network component, a UE capability indication that indicates the determined capability, wherein, in a first frequency range among the plurality of frequency ranges, the communication feature is associated with each of the plurality of duplex modes, and wherein, in a second frequency range among the plurality of frequency ranges, the communication feature is associated with a single one of the plurality of duplex modes.

2. The method of claim 1,
wherein the UE capability indication comprises a set of bits, and
wherein a number of bits included in the set of bits is equal to a number of duplex mode and frequency range combinations that are associated with the communication feature.

3. The method of claim 1,
wherein the UE capability indication comprises a set of bits, and
wherein a number of bits included in the set of bits is equal to a total possible number of duplex mode and frequency range combinations of the plurality of frequency ranges and the plurality of duplex modes.

4. The method of claim 1,
wherein, in the first frequency range, the communication feature is associated with frequency division duplex (FDD) and time division duplex (TDD), and
wherein, in the second frequency range, the communication feature is associated with TDD.

5. The method of claim 4,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

6. A method of operating a network component, comprising:
receiving, from a user equipment (UE), a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges; and
performing at least one action in response to the UE capability indication,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

7. The method of claim 6,
wherein the UE capability indication comprises a set of bits, and
wherein a number of bits included in the set of bits is equal to a number of duplex mode and frequency range combinations that are associated with the communication feature.

8. The method of claim 6,
wherein the UE capability indication comprises a set of bits, and
wherein a number of bits included in the set of bits is equal to a total possible number of duplex mode and frequency range combinations of the plurality of frequency ranges and the plurality of duplex modes.

9. The method of claim 6,
wherein, in the first frequency range, the communication feature is associated with frequency division duplex (FDD) and time division duplex (TDD), and
wherein, in the second frequency range, the communication feature is associated with TDD.

10. The method of claim 9,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

11. A user equipment (UE), comprising:
means for determining a capability of the UE to support two or more frequency range and duplex mode combinations associated with a communication feature, wherein the communication feature is associated with a plurality of frequency ranges and is further associated with a plurality of duplex modes on at least one of the plurality of frequency ranges; and
means for transmitting, to a network component, a UE capability indication that indicates the determined capability,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

12. The UE of claim 11,
wherein the UE capability indication comprises a set of bits, and wherein a number of bits included in the set of bits is equal to a number of duplex mode and frequency range combinations that are associated with the communication feature.

13. The UE of claim 11,
wherein the UE capability indication comprises a set of bits, and
wherein a number of bits included in the set of bits is equal to a total possible number of duplex mode and frequency range combinations of the plurality of frequency ranges and the plurality of duplex modes.

14. The UE of claim 11,
wherein, in the first frequency range, the communication feature is associated with frequency division duplex (FDD) and time division duplex (TDD), and
wherein, in the second frequency range, the communication feature is associated with TDD.

15. The UE of claim 14,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

16. A core network component, comprising:
means for receiving, from a user equipment (UE), a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges; and
means for performing at least one action in response to the UE capability indication,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

17. The network component of claim 16,
wherein the UE capability indication comprises a set of bits, and
wherein a number of bits included in the set of bits is equal to a number of duplex mode and frequency range combinations that are associated with the communication feature.

18. The network component of claim 16,
wherein the UE capability indication comprises a set of bits, and
wherein a number of bits included in the set of bits is equal to a total possible number of duplex mode and frequency range combinations of the plurality of frequency ranges and the plurality of duplex modes.

19. The network component of claim 16,
wherein, in the first frequency range, the communication feature is associated with frequency division duplex (FDD) and time division duplex (TDD), and
wherein, in the second frequency range, the communication feature is associated with TDD.

20. The core network component of claim 19,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

21. A user equipment (UE), comprising:
a memory; and
at least one processor coupled to the memory and configured to:
determine a capability of the UE to support two or more frequency range and duplex mode combinations associated with a communication feature, wherein the communication feature is associated with a plurality of frequency ranges and is further associated with a plurality of duplex modes on at least one of the plurality of frequency ranges; and
transmit, to a network component, a UE capability indication that indicates the determined capability,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

22. The UE of claim 21,
wherein the UE capability indication comprises a set of bits, and
wherein a number of bits included in the set of bits is equal to a number of duplex mode and frequency range combinations that are associated with the communication feature.

23. The UE of claim 21,
wherein the UE capability indication comprises a set of bits, and
wherein a number of bits included in the set of bits is equal to a total possible number of duplex mode and frequency range combinations of the plurality of frequency ranges and the plurality of duplex modes.

24. The UE of claim 21,
wherein, in the first frequency range, the communication feature is associated with frequency division duplex (FDD) and time division duplex (TDD), and wherein, in the second frequency range, the communication feature is associated with TDD.

25. The UE of claim 24,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

26. A network component, comprising:
a memory; and
at least one processor coupled to the memory and configured to:
receive, from a user equipment (UE), a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges; and
perform at least one action in response to the UE capability indication,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

27. The network component of claim 26,
wherein the UE capability indication comprises a set of bits, and
wherein a number of bits included in the set of bits is equal to a number of duplex mode and frequency range combinations that are associated with the communication feature.

28. The network component of claim 26,
wherein the UE capability indication comprises a set of bits, and
wherein a number of bits included in the set of bits is equal to a total possible number of duplex mode and frequency range combinations of the plurality of frequency ranges and the plurality of duplex modes.

29. The network component of claim 26,
wherein, in the first frequency range, the communication feature is associated with frequency division duplex (FDD) and time division duplex (TDD), and
wherein, in the second frequency range, the communication feature is associated with TDD.

30. The network component of claim 29,
wherein the UE supports FDD on the first frequency range if the UE capability indication indicates that the UE supports FDD,
wherein the UE supports TDD on the first frequency range if the UE capability indication indicates that the UE supports TDD,
wherein the UE supports FDD, TDD or both FDD and TDD, on the first frequency range if the UE capability indication indicates that the UE supports the first frequency range and support TDD,
wherein the UE supports FDD, TDD or both FDD and TDD on the first frequency range if the UE capability indication indicates that the UE supports the first frequency range,
wherein the UE supports TDD on the second frequency range if the UE capability indication indicates that the UE supports the second frequency range, or
any combination thereof.

31. A non-transitory computer-readable medium containing instructions stored thereon, for causing at least one processor in a user equipment (UE) to:
determine a capability of the UE to support two or more frequency range and duplex mode combinations associated with a communication feature, wherein the communication feature is associated with a plurality of frequency ranges and is further associated with a plurality of duplex modes on at least one of the plurality of frequency ranges; and
transmit, to a network component, a UE capability indication that indicates the determined capability,
wherein, in a first frequency range among the plurality of frequency ranges, the communication feature is associated with each of the plurality of duplex modes, and
wherein, in a second frequency range among the plurality of frequency ranges, the communication feature is associated with a single one of the plurality of duplex modes.

32. The non-transitory computer-readable medium of claim 31,
wherein the UE capability indication comprises a set of bits, and
wherein a number of bits included in the set of bits is equal to a number of duplex mode and frequency range combinations that are associated with the communication feature.

33. The non-transitory computer-readable medium of claim 31,
wherein the UE capability indication comprises a set of bits, and
wherein a number of bits included in the set of bits is equal to a total possible number of duplex mode and frequency range combinations of the plurality of frequency ranges and the plurality of duplex modes.

34. The non-transitory computer-readable medium of claim 31,
wherein, in the first frequency range, the communication feature is associated with frequency division duplex (FDD) and time division duplex (TDD), and
wherein, in the second frequency range, the communication feature is associated with TDD.

35. The non-transitory computer-readable medium of claim 34,
wherein the UE supports FDD on the first frequency range if the UE capability indication indicates that the UE supports FDD, wherein the UE supports TDD on the first frequency range if the UE capability indication indicates that the UE supports TDD, wherein the UE supports FDD, TDD or both FDD and TDD, on the first frequency range if the UE capability indication indicates that the UE supports the first frequency range and support TDD, wherein the UE supports FDD, TDD or both FDD and TDD on the first frequency range if the UE capability indication indicates that the UE supports the first frequency range, wherein the UE supports TDD on the second frequency range if the UE capability indication indicates that the UE supports the second frequency range, or any combination thereof.

36. A non-transitory computer-readable medium containing instructions stored thereon, for causing at least one processor in a network component to:

receive, from a user equipment (UE), a UE capability indication that indicates a capability of the UE to support two or more frequency range and each duplex mode combinations associated with a communication feature, wherein the communication feature is associated with a plurality of frequency ranges and is further associated with a plurality of duplex modes on at least one of the plurality of frequency ranges; and perform at least one action in response to the UE capability indication, wherein, in a first frequency range among the plurality of frequency ranges, the communication feature is associated with each of the plurality of duplex modes, and wherein, in a second frequency range among the plurality of frequency ranges, the communication feature is associated with a single one of the plurality of duplex modes.

37. The non-transitory computer-readable medium of claim 36, wherein the UE capability indication comprises a set of bits, and wherein a number of bits included in the set of bits is equal to a number of duplex mode and frequency range pairings that are permitted by the communication feature, wherein a number of bits included in the set of bits is equal to a number of duplex mode and frequency range combinations that are associated with the communication feature.

38. The non-transitory computer-readable medium of claim 36, wherein the UE capability indication comprises a set of bits, and wherein a number of bits included in the set of bits is equal to a total possible number of duplex mode and frequency range combinations of the plurality of frequency ranges and the plurality of duplex modes.

39. The non-transitory computer-readable medium of claim 36, wherein, in the first frequency range, the communication feature is associated with frequency division duplex (FDD) and time division duplex (TDD), and wherein, in the second frequency range, the communication feature is associated with TDD.

40. The non-transitory computer-readable medium of claim 39, wherein the UE supports FDD on the first frequency range if the UE capability indication indicates that the UE supports FDD, wherein the UE supports TDD on the first frequency range if the UE capability indication indicates that the UE supports TDD, wherein the UE supports FDD, TDD or both FDD and TDD, on the first frequency range if the UE capability indication indicates that the UE supports the first frequency range and support TDD, wherein the UE supports FDD, TDD or both FDD and TDD on the first frequency range if the UE capability indication indicates that the UE supports the first frequency range, wherein the UE supports TDD on the second frequency range if the UE capability indication indicates that the UE supports the second frequency range, or any combination thereof.

* * * * *